(12) United States Patent
Chang et al.

(10) Patent No.: US 6,419,255 B1
(45) Date of Patent: Jul. 16, 2002

(54) DRIVING STRUCTURE BETWEEN FRONT AND REAR WHEELS OF A VEHICLE

(76) Inventors: Yun-Chuan Chang; Chuan-Fu Kao, both of P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/818,778

(22) Filed: Mar. 28, 2001

(51) Int. Cl.[7] ................................................. B62M 1/02
(52) U.S. Cl. ................... 280/260; 280/259; 74/665 GE
(58) Field of Search ................................ 280/260, 259, 280/261, 212, 210; 74/417, 665 GE, 665 F

(56) References Cited

U.S. PATENT DOCUMENTS

| | | | | |
|---|---|---|---|---|
| 5,158,314 A | * | 10/1992 | Farras Pinos | 280/259 |
| 5,184,838 A | * | 2/1993 | Becoat | 280/259 |
| 5,224,725 A | * | 7/1993 | Erlston | 280/259 |
| 5,253,889 A | * | 10/1993 | Kaminski | 280/230 |
| 5,324,057 A | * | 6/1994 | Chartrand | 280/261 |
| 5,332,244 A | * | 7/1994 | Turner et al. | 280/230 |
| 5,390,946 A | * | 2/1995 | Spicer | 280/259 |
| 6,182,991 B1 | * | 2/2001 | Christini et al. | 280/230 |

* cited by examiner

*Primary Examiner*—Avraham Lerner
(74) *Attorney, Agent, or Firm*—Troxell Law Office PLLC

(57) ABSTRACT

A driving structure between front and rear wheels has two gear disks with wheel hub sleeves, pushing rolls and axle cores are inserted at the centers of the gear disks. Arresting members with polygonal crown supporting ribs on the circumferences are mounted between the axle cores and the pushing rolls to form wheel hubs disposed on the turning axles of the front and the rear wheels of the mobiles such as the bicycle and beach mobile. Two bevel gears are engaged with the gear disks and are connected by a steel cable so as to synchronously device the front and rear wheels.

1 Claim, 3 Drawing Sheets

DRIVING STRUCTURE BETWEEN FRONT AND REAR WHEELS OF A VEHICLE

BACKGROUND OF THE INVENTION

1) Field of the Invention

The invention herein relates to a driving structure between front and rear wheels of a vehicle, more especially, a driving structure, through the link-up of the steel cable, makes the synchronous driving of the front and rear wheels to increase the turning torsion of the mobile body.

2) Description of the Prior Art

The rear wheel of the conventional bicycle, the beach mobile or the motorcycle, due to the structural design, can only be turned by the link of the foot pedal or the engine and the front wheel turns freely. Therefore, when climbing a slope or running on the muddy road, the mobile body often fails in proceeding because of the skidding of the rear wheel. Although the present automobile is equipped with the so-called synchronous driving design for the front and the rear wheels, the four-wheeled automobile uses the different link-up method and structure. Therefore, the driving mechanism used for the automobile is not suitable for the mobiles such as the bicycles and that imperfection makes the light mobiles lack practical value. This kind of shortcoming has been criticized by and troubled the manufacturers and the consumers for a long time. Therefore, it is necessary to provide a driving structure between the front and rear wheels capable of specifically increasing the effect and enhancing the practical value of the product.

SUMMARY OF THE INVENTION

The primary objective of the invention herein is to provide a driving structure between the front and rear wheels which comprises two wheel naves, or hubs, with gear disks, sleeves, rolls and axle cores mounted thereon and arresting members of polygonal crown supporting ribs on the circumference disposed between the axle cores and the rolls so as to mount two wheel hubs on the turning axles of the front and the rear wheels of the bicycle, the beach mobile or the motorcycle. Two bevel gears pivotally jointed to the gear disks and connected by the steel cables achieve the effect of making the front and the rear wheels drive synchronously to increase the torsion of the mobile by the push of the rolls and through the link-up of the steel cables and the bevel gears by the turning of the rear wheel.

To enable a further understanding of the main features and innovation of the invention herein, the brief description of the drawings below is followed by detailed description of the preferred embodiment.

DETAILED DESCRIPTION OF THE PREFERRED EMBODIMENTS

Figure 1:
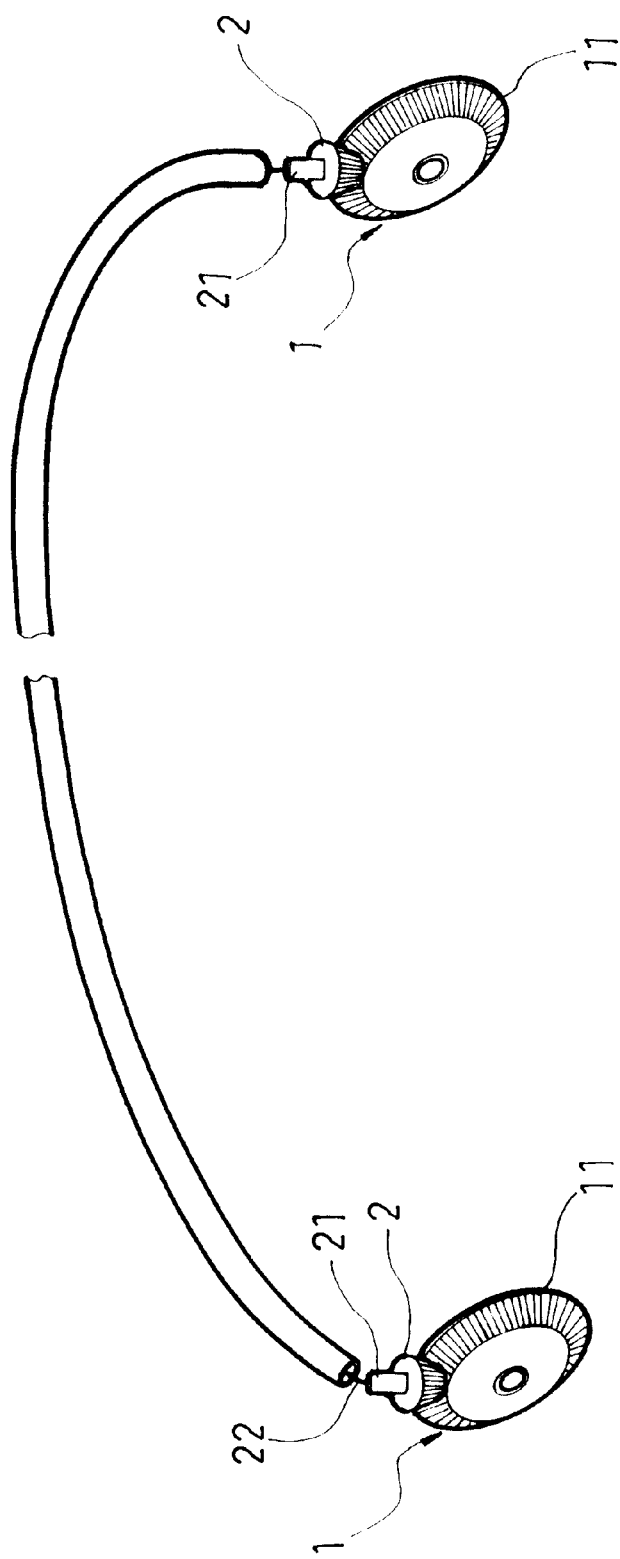
FIG. 1 is a pictorial isometric drawing of the invention herein.
Figure 2:
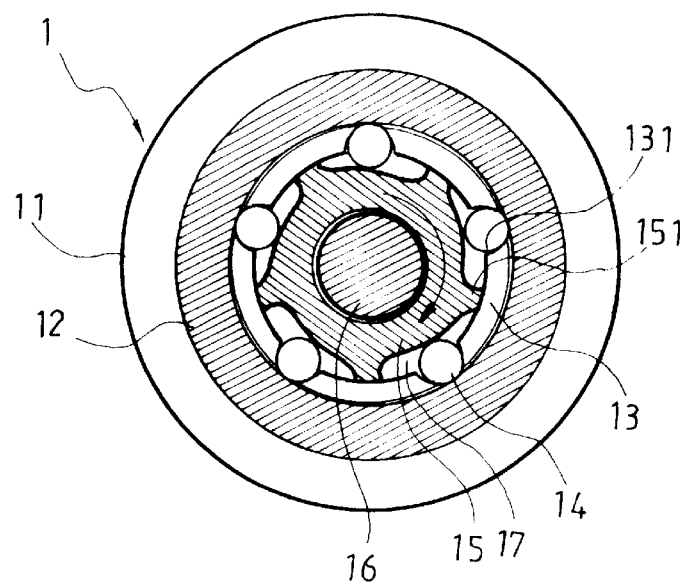
FIG. 2 is a cross-sectional drawing of the wheel nave structure of the invention herein.
Figure 3:
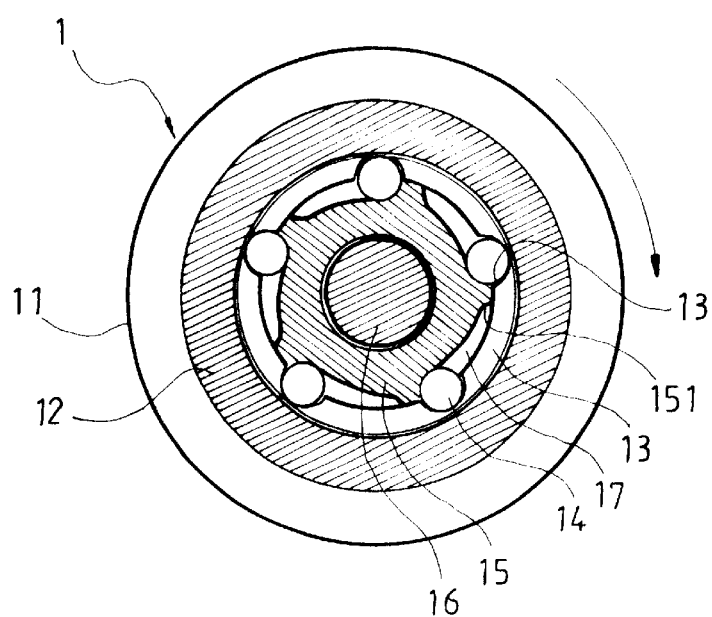
FIG. 3 is an cross-sectional drawing of the link-up embodiment of the wheel naves of the invention herein in application.

Referring to FIGS. 1, 2, & 3, the invention herein mainly comprises of two hubs (1) with gear disks (11) thereon and covering wheel nave sleeves (12) and having roll housing rings (13) with several round slots (131) mounted inside the sleeves (12) to locate the same amount of pushing rolls (14) into the round slots (131).

An arresting member (15) is jointed to the axle core (16), wherein the circumference of the said arresting member (15) has spaced apart crown supporting ribs (151) and in the same amount as the rolls (14). The crown supporting ribs (151) project in gradually increasing height from the circumference of the arresting member (15) defining the enlarging gaps (17) between the rolls (14) and the arresting member (15).

Two bevel gears (2) Pivotally engage the gear disks (11) and are joined to two cubical fastening blocks (21) and connected by steel cable (22).

Through the assembly of the members mentioned above, the two wheel hubs (1) are mounted respectively on the front and the rear wheels of the bicycle, the beach mobile or the motorcycle; when the rear wheel turns (as the pedals of the bicycle are turned), the arresting member (15) crowns urge the rolls (14) against the wheel sleeves (1 2) to drive the gear disk (11) and turn the gear disk (11) of the front wheel via the link-up of the bevel gears (2). Therefore, the roll (14) pushes against the arresting member (15) and the sleeve (12) to drive the axle core (16) to make the front and the rear wheels drive synchronously to increase the turning torsion. When the arresting member (15) of the rear wheel is not turning (as when the pedals of the bicycle are not turning), the rolls (14) separates from the sleeve (12) to make the front and the rear wheels turn freely.

Figure 4:
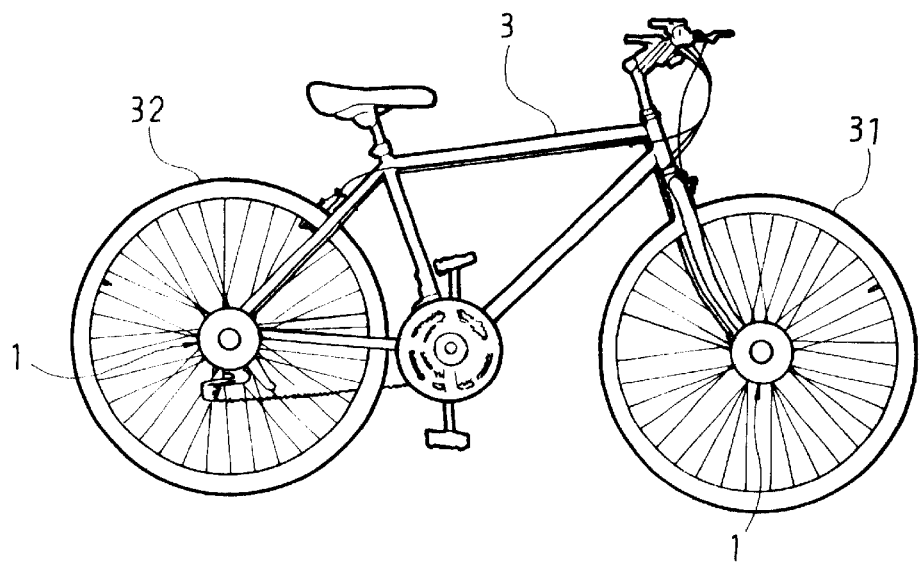
FIG. 4 is a side view of the application of the invention herein.
Figure 5:
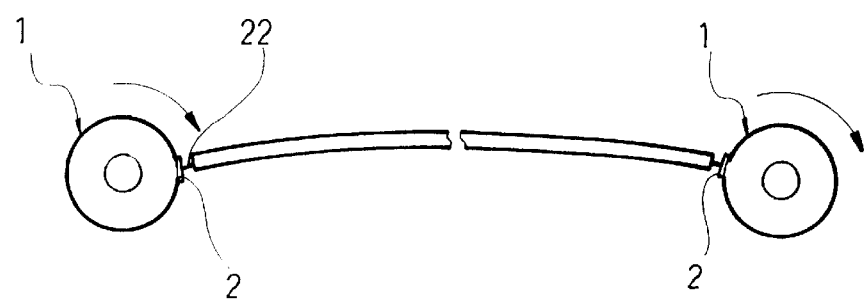
FIG. 5 is a schematic drawing of the link-up embodiment of the invention herein.

Referring to FIGS. 4 & 5, the invention herein can be applied to the general bicycle, beach mobile or the motorcycle. As shown in FIG. 4, when applied to the bicycle (3), two wheel hubs (1) are mounted respectively on the turning axles of the front and the rear wheels (31, 32) and engage the bevel gears (2) connected by the steel cable (22). When the bicycle (3) is pedaled to move, through the link-up of the bevel gears, the front and rear wheels (31, 32) drive synchronously so as to increase the turning torsion. Therefore, if the mobile is stuck in the mud or climbing a slope, the ground grabbing force can be enhanced to enable the mobile to run more smoothly and with more energy-saving.

In summation of the foregoing, the invention herein, using the wheel hubs mounted with the rolls, the arresting members and the gear disks to combine with the bevel gears and the link-up steel cables to construct the link between the front and the rear wheels increases the linking torsion of the mobile.

What is claimed is:

1. A driving mechanism for driving wheels of a vehicle having front and rear wheels in which a driving force is applied to the rear wheel, the mechanism comprising:

(a) an axle core on the front wheel;
   (b) a first hub driven by the rear wheel, the first hub including a first gear disk;
   (c) a first bevel gear engaging the first gear disk of the first hub, the first bevel gear joined to a first cubical fastening block;
   (d) an arresting member jointed to the axle core, the arresting member having a plurality of crown supporting ribs extending therefore, each gradually increasing in height from a circumference of the arresting member so as to form enlarging gaps;

(e) a second hub including a second gear disk and an inner housing ring with a plurality of arcuate slots therein facing toward the arresting member, the number of arcuate slots being equal to the number of crown supporting ribs on the arresting member;

(f) a pushing roll located in each enlarging gap and engaging one of the plurality of arcuate slots;

(g) a second bevel gear engaging the second gear disk of the second hub, the second bevel gear joined to a second cubical fastening block; and, (h) a transmission cable connected to the first and second bevel gears.

* * * * *